United States Patent
Reijonen et al.

(10) Patent No.: US 10,545,258 B2
(45) Date of Patent: Jan. 28, 2020

(54) CHARGED PARTICLE EMITTER ASSEMBLY FOR RADIATION GENERATOR

(71) Applicant: Schlumberger Technology Corporation, Sugar Land, TX (US)

(72) Inventors: Jani Petteri Reijonen, Princeton, NJ (US); Irina Molodetsky, Princeton Junction, NJ (US); Joel Mark Wiedemann, Allentown, NJ (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 15/469,154

(22) Filed: Mar. 24, 2017

(65) Prior Publication Data

US 2017/0276826 A1    Sep. 28, 2017

Related U.S. Application Data

(60) Provisional application No. 62/312,484, filed on Mar. 24, 2016.

(51) Int. Cl.
*G01V 5/10*    (2006.01)
*G01V 5/12*    (2006.01)

(52) U.S. Cl.
CPC .  *G01V 5/10* (2013.01); *G01V 5/12* (2013.01)

(58) Field of Classification Search
CPC ...... H01J 27/024; H01J 37/08; H01J 2237/08; H01J 27/02; H01J 35/04; H01J 35/32; H01J 3/04; H01J 35/06; G21G 4/02; E21B 47/011; G01V 5/10; G01V 5/04; G01V 5/085; G01V 5/12; G01V 9/00

USPC ........................................................ 250/269.1
See application file for complete search history.

(56) References Cited

U.S. PATENT DOCUMENTS

| | | | | |
|---|---|---|---|---|
| 3,084,256 A | * | 4/1963 | Tittle .................. | G01V 5/10 376/111 |
| 4,528,474 A | * | 7/1985 | Kim ..................... | H01J 1/15 313/300 |
| 5,243,252 A | * | 9/1993 | Kaneko ................ | H01J 9/025 313/309 |
| 5,601,734 A | * | 2/1997 | Luo ..................... | H05H 1/34 219/119 |
| 6,181,049 B1 | * | 1/2001 | Streckert ............. | H01J 45/00 310/306 |

(Continued)

*Primary Examiner* — Taeho Jo
(74) *Attorney, Agent, or Firm* — Trevor G. Grove

(57) ABSTRACT

An electronic radiation generator may include a target material that emits radiation in response to being struck by an accelerated electron beam, an accelerator chamber that accelerates the electron beam toward the target, and a cathode emitter that emits electrons from an exposed surface of a thermionic emission material of the cathode emitter. The cathode emitter may have a thermionic emission material that is partially covered and partially exposed by a protective layer, which may focus the electron beam. Additionally or alternatively, an aperture assembly may form an aperture in front of the cathode emitter in relation to the target. The aperture assembly may at least partially block the exposed surface of the thermionic emission material in relation to the target. Since the aperture shapes the electron beam, the aperture causes the electron beam to remain more stable even when the cathode emitter shakes or vibrates.

20 Claims, 7 Drawing Sheets

(56) References Cited

U.S. PATENT DOCUMENTS

| | | | | |
|---|---|---|---|---|
| 6,495,865 B2 * | 12/2002 | Johnson | H01J 3/022 | 257/164 |
| 6,774,532 B1 * | 8/2004 | Marshall | G21H 1/106 | 136/201 |
| 9,790,620 B1 * | 10/2017 | Katsap | C30B 29/66 | |
| 2002/0102753 A1 * | 8/2002 | Johnson | H01J 3/022 | 438/20 |
| 2005/0174030 A1 * | 8/2005 | Katsap | H01J 1/148 | 313/346 R |
| 2009/0108192 A1 * | 4/2009 | Groves | H05H 3/06 | 250/269.4 |
| 2009/0223548 A1 * | 9/2009 | Walitzki | H01J 45/00 | 136/205 |
| 2009/0273269 A1 * | 11/2009 | Gartner | H01J 1/28 | 313/346 DC |
| 2009/0284124 A1 * | 11/2009 | Kutschera | H01J 1/14 | 313/346 DC |
| 2010/0066380 A1 * | 3/2010 | Knapp | G01L 21/32 | 324/462 |
| 2010/0181471 A1 * | 7/2010 | Pop | G01V 9/00 | 250/254 |
| 2010/0266102 A1 * | 10/2010 | Lee | B23K 1/0008 | 378/127 |
| 2011/0114830 A1 * | 5/2011 | Reijonen | H01J 35/04 | 250/251 |
| 2011/0180698 A1 * | 7/2011 | Stephenson | H05H 3/06 | 250/269.1 |
| 2012/0063558 A1 * | 3/2012 | Reijonen | H01J 35/04 | 376/108 |
| 2012/0200613 A1 * | 8/2012 | Sagawa | H01J 17/04 | 345/690 |
| 2013/0180780 A1 * | 7/2013 | Chirovsky | G01N 23/005 | 175/50 |
| 2014/0097736 A1 * | 4/2014 | Katsap | H01J 1/14 | 313/37 |
| 2014/0139100 A1 * | 5/2014 | Kobayashi | H01J 1/148 | 313/346 R |
| 2014/0183349 A1 * | 7/2014 | Flores | H01J 27/205 | 250/256 |
| 2014/0183376 A1 * | 7/2014 | Perkins | H01J 27/205 | 250/424 |
| 2014/0184074 A1 * | 7/2014 | Perkins | H01J 27/04 | 315/111.91 |
| 2014/0263993 A1 * | 9/2014 | Perkins | G21G 4/02 | 250/253 |
| 2014/0263998 A1 * | 9/2014 | Perkins | H01J 27/024 | 250/269.6 |
| 2014/0265858 A1 * | 9/2014 | Perkins | H01J 27/024 | 315/111.91 |
| 2015/0022080 A1 * | 1/2015 | Umbach | H01J 1/94 | 315/12.1 |
| 2015/0054398 A1 * | 2/2015 | Yan | H01J 1/304 | 313/341 |
| 2015/0168579 A1 * | 6/2015 | Perkins | H01J 35/045 | 378/53 |
| 2015/0168590 A1 * | 6/2015 | Perkins | H01J 27/04 | 250/261 |
| 2015/0207457 A1 * | 7/2015 | Trucchi | H01J 45/00 | 136/206 |
| 2016/0068384 A1 * | 3/2016 | Cui | B81C 1/00111 | 257/618 |
| 2016/0079029 A1 * | 3/2016 | Li | H01J 35/06 | 378/122 |
| 2016/0133432 A1 * | 5/2016 | Reijonen | H01J 35/14 | 250/269.1 |
| 2016/0320520 A1 * | 11/2016 | Hiles | E21B 47/1015 | |

* cited by examiner

CHARGED PARTICLE EMITTER ASSEMBLY FOR RADIATION GENERATOR

BACKGROUND

This disclosure relates to a charged particle emitter assembly for an electronic radiation generator that provides a stable and/or focused charged particle beam, even despite harsh conditions, such as a downhole well environment.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as an admission of any kind.

Electronic radiation generators are used by many downhole well-logging tools. Electronic radiation generators may generate radiation by accelerating charged particles, such as ions or electrons, toward a target. When the charged particles strike the target, radiation such as neutrons or x-rays may be generated. The radiation may exit the downhole tool and into a geological formation adjacent a wellbore where the downhole tool is located. Measurements of the radiation that returns to the downhole tool may provide an indication of where hydrocarbon resources may be located, as well as other characteristics of the geology of the formation. Because the measurement of the radiation that returns to the downhole tool depends in part on the amount of radiation that is emitted by the electronic radiation generator, providing a more consistent or predictable the supply of radiation may allow for a more accurate and/or precise measurement.

When an electronic radiation generator uses electrons as the charged particles that are accelerated toward the target to produce radiation, a cathode emitter may provide the electrons in the form of an electron beam. Any variations in the electron beam may affect the amount of radiation that is produced when the electron beam strikes the target. In many laboratory settings, an electronic radiation generator may be held in place or moved smoothly while in use, and thus the electron beam may be relatively stable. In a downhole setting, however, the electronic radiation generator may be subject to intense shocks and movement, which could have a significant impact on the stability of the electron beam and, by extension, the radiation flux output by the electronic radiation generator.

SUMMARY

A summary of certain embodiments disclosed herein is set forth below. These aspects are presented merely to provide the reader with a summary of these certain embodiments and that these aspects are not intended to limit the scope of this disclosure. Indeed, this disclosure may encompass a variety of aspects that may not be set forth below.

In one example, a downhole tool may include an electronic radiation generator and a radiation detector. The electronic radiation generator may generate radiation to be output from the downhole tool, some of which may be detected by the radiation generator when it returns of the downhole tool. The electronic radiation generator may include a cathode emitter that emits electrons that accelerate through an acceleration chamber and strike a target, producing the radiation. The cathode emitter may include a substrate, a thermionic emission material disposed over at least part of the substrate, and a protective layer partially disposed over the thermionic emission material. At least part of the thermionic emission material may be exposed through the protective layer.

In another example, an electronic radiation generator may include a target material that emits radiation in response to being struck by an accelerated electron beam, an accelerator chamber that accelerates the electron beam toward the target, and a cathode emitter that emits electrons from an exposed surface of a thermionic emission material of the cathode emitter. An aperture assembly may form an aperture in front of the cathode emitter in relation to the target, and may at least partially block the exposed surface of the thermionic emission material in relation to the target. Since the aperture shapes the electron beam, the aperture causes the electron beam to remain more stable despite movement by the electronic radiation generator that may shake the cathode emitter, which would otherwise cause the electron beam to be less stable without the aperture assembly.

In another example, a method for manufacturing a focused emitter for a radiation generator includes depositing a thermionic emission material on a substrate, depositing a protective layer on top of the thermionic emission material, and removing a portion of the protective layer to at least partially expose the thermionic emission material.

Various refinements of the features noted above may be undertaken in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The summary presented above is intended to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

Figure 1:
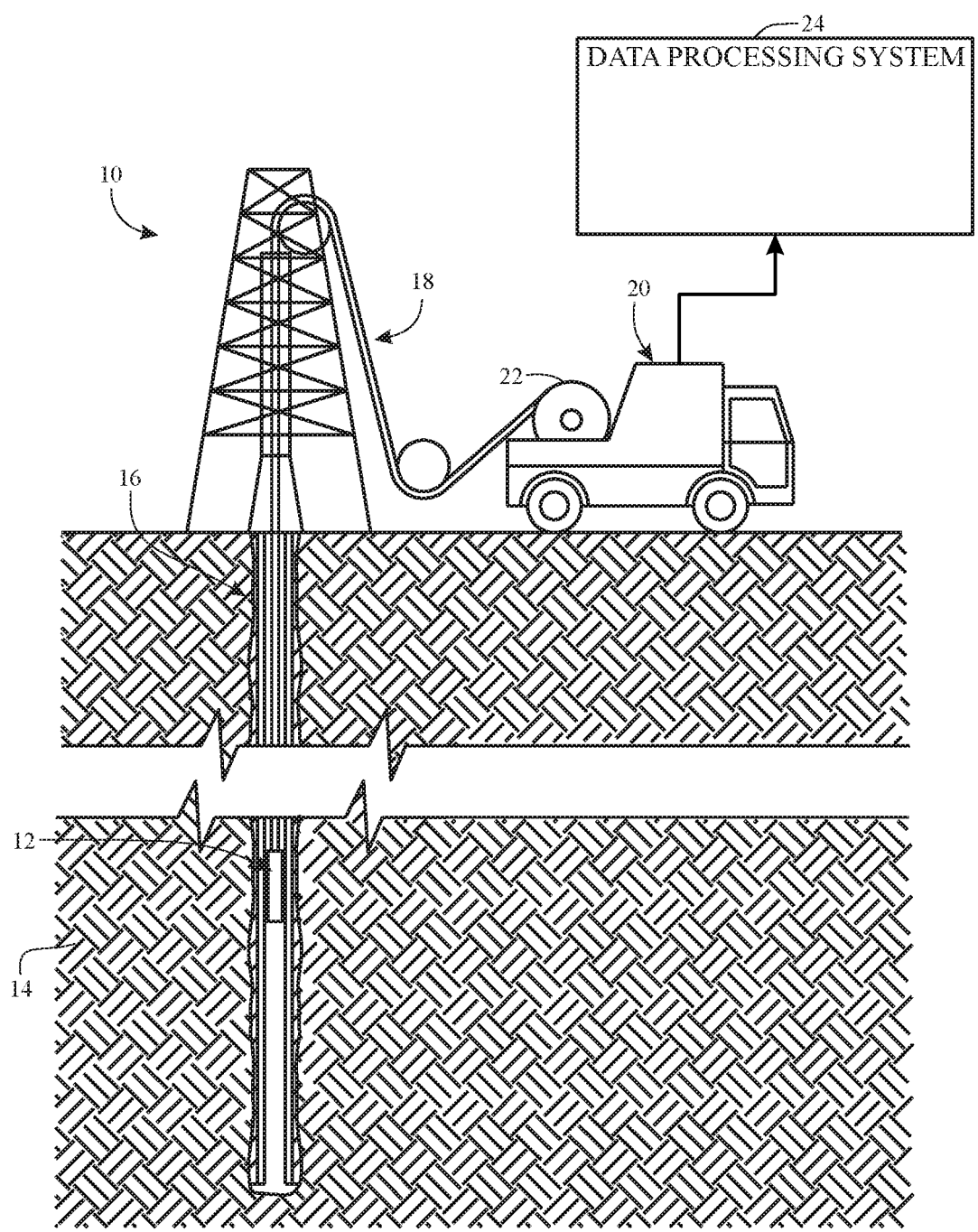
FIG. 1 is a schematic diagram of a wellsite system that may employ a compact radiation generator in a downhole tool, in accordance with an embodiment.

One or more specific embodiments of the present disclosure will be described below. These described embodiments are examples of the presently disclosed techniques. Additionally, to provide a concise description of these embodiments, features of an actual implementation may not be described in the specification. It should be appreciated that in the development of any such actual implementation, as in any engineering or design project, numerous implementation-specific decisions may be made to achieve the developers' specific goals, such as compliance with system-related and business-related constraints, which may vary from one implementation to another. Moreover, it should be appreciated that such a development effort might be complex and time consuming, but would still be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, references to "one embodiment" or "an embodiment" of the present disclosure are not intended to be interpreted as excluding the existence of additional embodiments that also incorporate the recited features.

A downhole tool may use an electronic radiation generator to generate radiation. The radiation generator may accelerate a beam of charged particles, such as electrons, toward a target material. When the charged particles strike the target material, the target material may produce radiation such as x-rays or neutrons. The radiation may be used by the downhole tool to assess properties of a well, which may indicate the presence or absence of hydrocarbons at locations in the geological formation that surrounds the well. The downhole tool may also use the radiation to identify many other properties of the geological formation, such as porosity, lithology, density, and so forth.

Variations in the charged particle beam may affect the amount of radiation that is produced by the electronic radiation generator. The charged particle emitter assembly of this disclosure, however, may provide a more focused and/or stable electron beam. While the following disclosure will refer to an electron emitter assembly as the charged particle emitter assembly, the principles disclosed in relation to the electron emitter assembly may be used to make or use emitter assemblies for other types of particles (e.g., ions).

The electron emitter assembly of this disclosure may include an electron emitter that may have a thermionic emission material sandwiched between a substrate and a protective layer. The protective layer may have an aperture that exposes at least some of the thermionic emission material. When the thermionic emission material is heated to a higher enough temperature, which may be referred to as a thermal emission temperature and which may occur, for example, by passing sufficient current through the emitter, electrons may be released through the aperture in the protective layer. This may preclude the undesirable emission of electrons from the edges of the thermionic emission material. In addition, the surface of the thermionic emission material or the protective layer may be shaped to focus emitted electrons by etching and/or ion milling.

In another example, the electron beam may be stabilized by providing an aperture assembly in front of the electron emitter. The aperture assembly may block an outermost portion of a diameter the active thermionic emission material of the emitter in relation to the target. Because the aperture may be held in place by an aperture assembly that is fixed in place in relation to the target, the electron beam output through the aperture assembly may remain stable in relation to the target even when the emitter moves or shakes. Thus, the electronic radiation generator may provide a more stable output even in a harsh downhole environment.

With this in mind, FIG. 1 illustrates a well-logging system 10 that may employ the systems and methods of this disclosure. The well-logging system 10 may be used to convey a downhole tool 12 that includes such scintillator detectors through a geological formation 14 via a wellbore 16. The downhole tool 12 may be conveyed on a cable 18 via a logging winch system 20. Although the logging winch system 20 is schematically shown in FIG. 1 as a mobile logging winch system carried by a truck, the logging winch system 20 may be substantially fixed (e.g., a long-term installation that is substantially permanent or modular). Any suitable cable 18 for well logging may be used. The cable 18 may be spooled and unspooled on a drum 22.

Although the downhole tool 12 is described as a wireline downhole tool, it should be appreciated that any suitable conveyance may be used. For example, the downhole tool 12 may instead be conveyed as a logging-while-drilling (LWD) tool as part of a bottom hole assembly (BHA) of a drill string, conveyed on a slickline or via coiled tubing, and so forth. For the purposes of this disclosure, the downhole tool 12 may be any suitable measurement tool that generates radiation using a compact electronic radiation generator having an emitter assembly that produces a focused electron beam through an aperture assembly or a thermionic emission aperture, as discussed below. The downhole tool 12 may provide radiation measurements (e.g., counts of detected gamma-rays or x-rays) to a data processing system 24 via any suitable telemetry (e.g., via electrical signals pulsed through the geological formation 14 or via mud pulse telemetry). The data processing system 24 may process the radiation measurements to identify certain properties of the wellbore 16 (e.g., porosity, permeability, relative proportions of water and hydrocarbons, and so forth) that may be otherwise indiscernible by a human operator.

By way of example, the data processing system 24 may include a processor, which may execute instructions stored in memory and/or storage. As such, the memory and/or the storage of the data processing system 24 may be any suitable article of manufacture that can store the instructions. The memory and/or the storage may be ROM memory, random-access memory (RAM), flash memory, an optical storage medium, or a hard disk drive, to name a few examples. A display, which may be any suitable electronic display, may provide a visualization, a well log, or other indication of properties of the wellbore 16.

Figure 2:
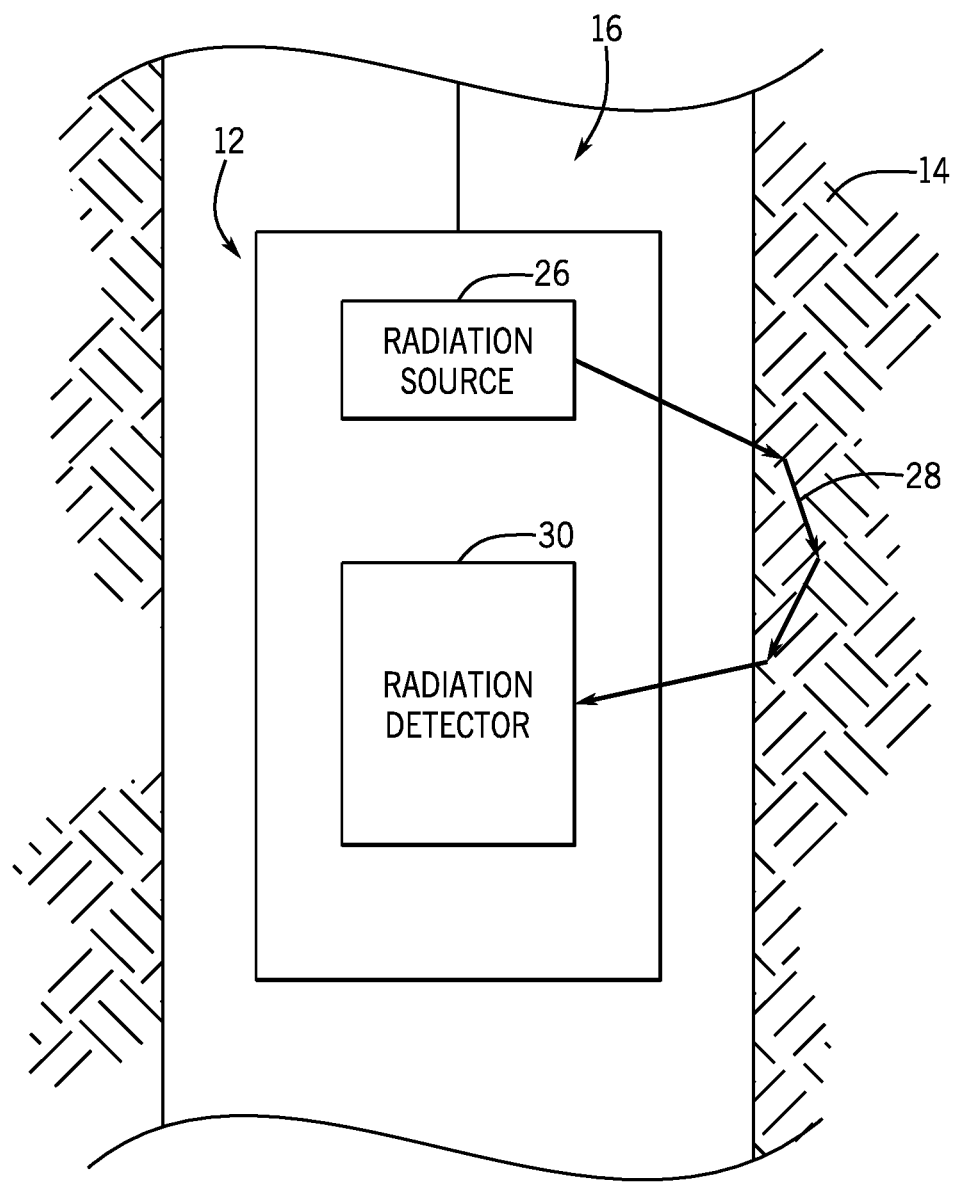
FIG. 2 is a block diagram of the downhole tool that may employ the compact radiation generator, in accordance with an embodiment.

One example of the downhole tool 12 is shown in FIG. 2. The downhole tool 12 may include a radiation source 26 to emit radiation 28 into the geological formation 14. The radiation source includes an electronic radiation generator, such as an electronic x-ray generator or an electronic neutron generator. The radiation source 26 emits radiation 28 out of the downhole tool 12. For example, the radiation 28 may enter the geological formation 14, where it may scatter or collide with atoms of the geological formation 14 to generate other radiation that also may scatter. Some of the radiation 28 or radiation that results from interactions with the radiation 28 in the geological formation 14 may scatter and return to the downhole tool 12, to be detected by a radiation detector 30. In general, the radiation detector 30 may detect when ionizing radiation enters the downhole tool 12 and generate an electrical signal, such as a count rate of detected radiation or spectrum of detected radiation that may provide an indication of characteristics of the wellbore 16 or the geological formation 14.

Figure 3:
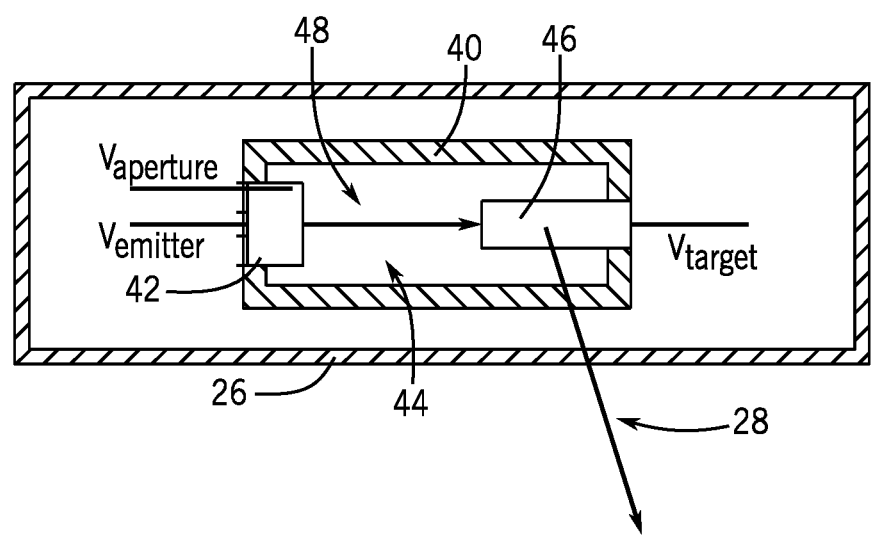
FIG. 3 is a block diagram of the compact radiation generator, in accordance with an embodiment.

FIG. 3 shows an example of the radiation source 26 in the form of a compact electronic radiation generator. The radiation source 26 may include an acceleration chamber housing 40 that may contain an emitter assembly 42, an acceleration chamber 44, and a target 46. The acceleration chamber housing 40 may be coated with an insulating material, such as $Al_2O_3$, which has a high secondary electron emission coefficient. As such, the spread of electrons on the surface of the insulator material could create short-circuit paths if electrons are sputtered against the walls of the acceleration chamber housing 40, which could result due to electron beam defocusing or beam spot movement in a harsh downhole environment. As such, the electron emitter assembly 42 may produce a focused and stable electron beam that strikes the target 46. In particular, the emitter assembly 42 may be electrostatically biased with relatively negative voltages on an emitter of the emitter assembly 42 ($V_{emitter}$) and/or on an aperture of the electron emitter assembly 42 ($V_{aperture}$). In contrast, the target 46 may have a relatively positive voltage ($V_{target}$). As such, the negatively charged electron beam 42 accelerates from the lower voltage potential of the emitter assembly 42 toward the higher voltage potential of the target 46. The accelerated electrons of the electron beam 48 impact materials in the target 46 and cause the target 46 to give off radiation 28 (e.g., via Brehmstrahlung process) in response.

Figure 4:
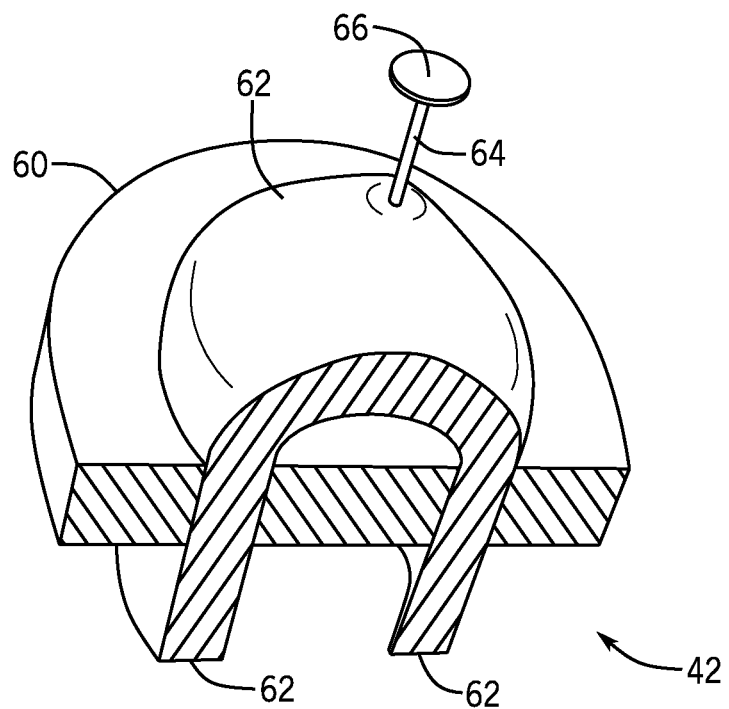
FIG. 4 is a perspective view of a cathode electron emitter assembly that may be used in the compact radiation generator, in accordance with an embodiment.

The electron emitter assembly 42 may take a variety of forms. In one example, shown in FIG. 4, the electron emitter assembly 42 may include a ceramic base 60 that hold support electrodes 62. The support electrodes 62 may provide an electrical current to emitter electrodes 64 that passes through an emitter 66. The electrical current may heat the emitter, which causes the emitter 66 to emit electrons via thermionic emission.

Figure 5:
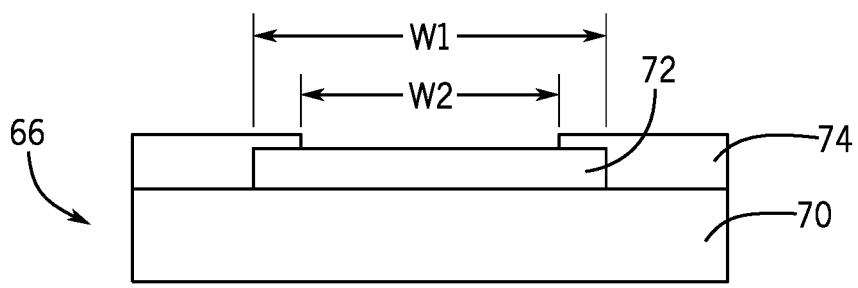
FIG. 5 is a cross-sectional side view of a focused electron emitter disk that may form part of the cathode electron emitter assembly, in accordance with an embodiment.

As shown in FIG. 5, the emitter 66 may be include a metallic substrate 70 that supports a thermionic emission material 72. A protective layer 74 may at least partially cover the thermionic emission material 72, defining an aperture through which electrons may be emitted from a surface of the thermionic emission material 72. For example, although the thermionic emission material 72 may have a total first diameter or width W1, the protective layer 74 may expose a smaller aperture diameter or width W2. This may provide superior control over the emission of electrons from the emitter 66, since electrons will be less likely to be emitted from the sides or back of the thermionic emission material 72 in relation to the target 46. In addition, the specific shape of the aperture exposing the thermionic emission material 72 may be defined based on experimentation or modeling to achieve an optimized electron beam shape and beam spot location on the target 46.

The substrate 70 may be any suitable metallic substrate that can conduct the electrical current to heat and electrically bias the thermionic emission material 72. The thermionic emission material 72 may include any suitable material that emits electrons when heated. Examples of such materials include yttrium oxide or lanthanum hexaboride. The protective layer 74 may be any suitable overlayer metal. In some cases, the protective layer 74 may be sputtered or evaporated onto the surface of the thermionic emission material 72. The protective layer 74 may have a higher work function then the thermionic emission material 72. For instance, when the thermionic emission material 72 includes yttrium oxide, the work function of the thermionic emission material 72 may be about 2.6 eV. Thus, in some embodiments, the work function of the protective layer 74 may be greater than 2.6 eV. In certain examples, the protective layer 74 may be platinum or another suitable noble metal. Because platinum and other such noble metals have relatively high melting points, these materials may remain solid even as the thermionic emission material 72 reaches high enough temperatures to emit electrons. Other metals with such high melting points may also serve as or be included in the protective layer 74.

Figure 6:
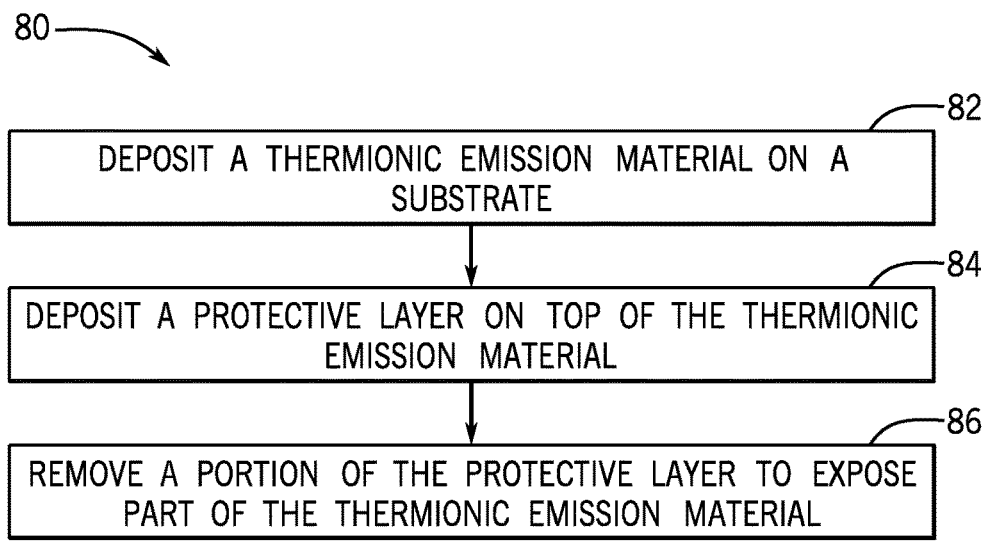
FIG. 6 is a flowchart of a method for manufacturing the focused electron emitter, in accordance with an embodiment.
Figure 7:
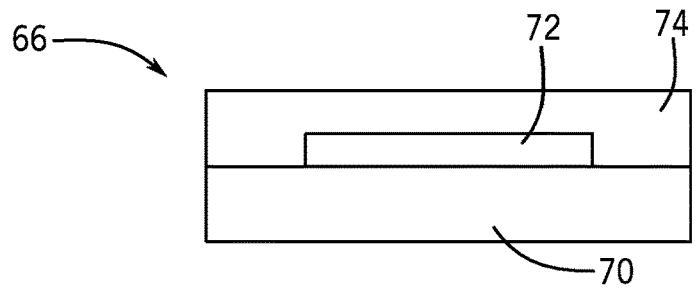
FIG. 7 is a cross-sectional view of the focused electron emitter during manufacture, in accordance with an embodiment.

FIG. 6 is a flowchart 80 of a method for manufacturing a focused electron emitter 66. The thermionic emission material 72 may be deposited onto a metallic substrate (block 82). The protective layer 74 may be deposited over the thermionic emission material 72 (block 84). For example, the protective layer 74 may be sputtered or evaporated on the surface of the thermionic emission material 72. At this point, the focused electron emitter 66 may have a cross-sectional form as shown in FIG. 7. To form an aperture through which the thermionic emission material 72 can emit electrons, a portion of the protective layer 74 may be removed to expose part of the thermionic emission material 72 (block 86). Removing the portion of the protective layer 74 may also involve removing part of the thermionic emission material 72. The removal process of block 86 may involve any suitable technique, including ion beam milling or ion beam etching. Block 86 may involve patterning the protective layer 74 and/or the thermionic emission material 72 using an ion beam, and the endpoint direction may be controlled by secondary ion mask spectroscopy (SIMS).

Figure 8:
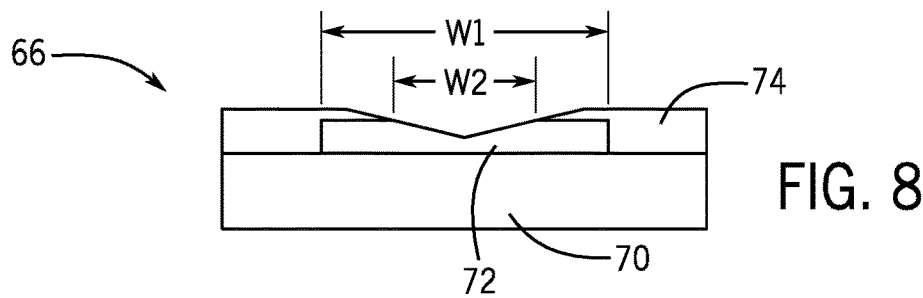
FIG. 8 is cross-sectional view of an example of the focused electron emitter that includes etching or milling of a thermionic emission material, in accordance with an embodiment.

The resulting focused electron emitter 66 may take the form discussed above with reference to FIG. 5, in which the exposed surface of the thermionic emission material is substantially planar, or may take a form in which the exposed surface of the thermionic emission material is substantially non-planar, such as shown in FIG. 8. In FIG. 8, like FIG. 5, a diameter or width W1 of the total thermionic emission material 72 is greater than a diameter or width W2 of an exposed surface of the thermionic emission material 72. In addition, a portion of the thermionic emission material 72 has been removed, giving the exposed surface of the thermionic emission material a non-planar shape. Here, an inversely conical shape generally provides an increased area of the exposed surface thermionic emission material 72 for a comparable aperture diameter or width W2.

Figure 9:
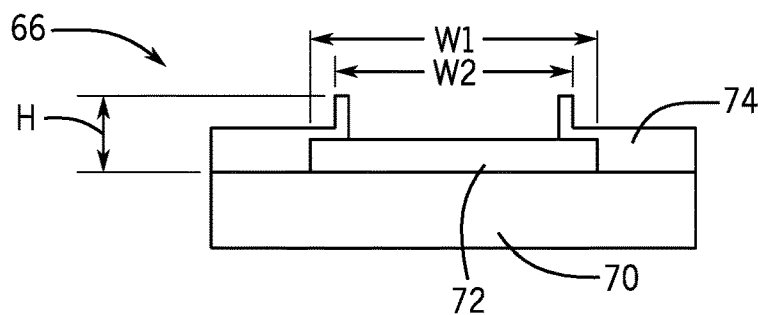
FIG. 9 is a cross-sectional view of an example of the focused electron emitter that includes a shaped protective metal layer over a thermionic emission material, in accordance with an embodiment.

In an example shown in FIG. 9, the aperture of the exposed surface of the thermionic emission material 72 may be patterned using an ion beam, while an end point detection is controlled by secondary ion mask spectroscopy (SIMS). A thickness or height H of the shape of the protective layer 74 may be adjusted based on a desired profile, etching rate, tilting angle, or the like, as may be the etched shape of the thermionic emission material 72. Indeed, while the exposed surface of thermionic emission material 72 is illustratively shown in a planar configuration, the thermionic emission material 72 may also be etched to have a non-planar shape. This etch profile may be optimized with respect to the electron emitter 66 structure to take advantage of shaping electrical field features that are etched in the protective layer 74. That is, ion beam etching can be used to create any suitable desired pattern in the protective layer 74 and/or the thermionic emission material 72, which may shape the electrical field that guides the flow of electrons out from the thermionic emission material 72. The particular pattern used for the protective layer 74 and/or the thermionic emission material 72 may be determined based on electrical field modeling and/or experimentation.

Figure 10:
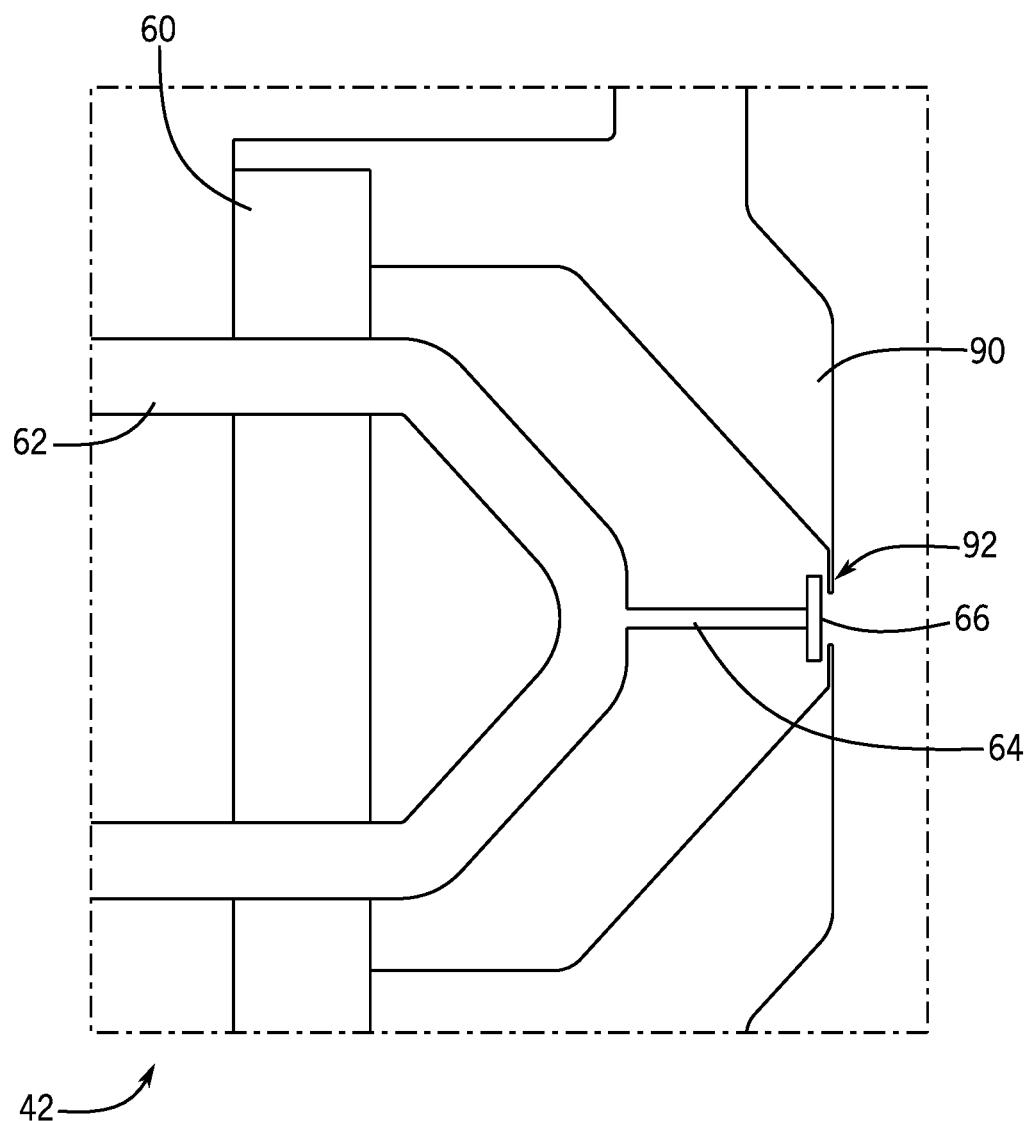
FIG. 10 is another example of the cathode electron emitter assembly that includes an aperture assembly in front of the emitter to focus and/or stabilize an emitted electron beam even despite movement of the emitter, in accordance with an embodiment.

The electron emitter assembly 42 may, additionally or alternatively, include an aperture assembly 90 that creates an aperture 92 over the electron emitter 66, as shown in FIG. 10. The aperture assembly 90 may use one of the focused electron emitters 66 described above, or may use any other suitable electron emitter 66. As shown in FIG. 10, the aperture assembly 90 may attach to the insulator 60 and fixedly couple to the acceleration chamber housing 40. The aperture assembly 90 may be formed from any suitable electrode material. As discussed above with reference to FIG. 3, the aperture assembly 90 may be electrostatically biased by a voltage $V_{aperture}$ that may be higher or lower than the electrostatic bias of the emitter 66 $V_{emitter}$ (as illustrated in FIG. 3).

Figures 11, 12:
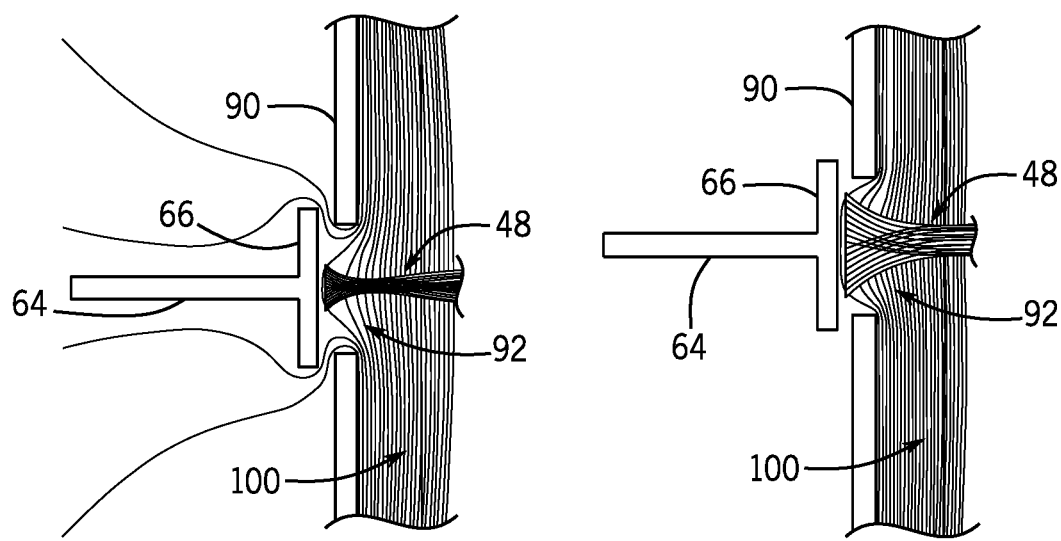
FIG. 11 is an electrical field simulation diagram representing an effect on the electron beam for a relatively more negative electrostatic bias of the aperture assembly, in accordance with an embodiment.
FIG. 12 is an electrical field simulation diagram representing an effect of the electron beam for a relatively less negative electrostatic bias of the aperture assembly, in accordance with an embodiment.

Varying the relationship between the electrostatic bias of the emitter 66 and the aperture assembly 90 changes the emission pattern of the electron beam 48. This is shown by way of example in FIGS. 11 and 12. In FIG. 11, the aperture assembly 90 has a more negative bias, and in FIG. 12, the aperture assembly 90 has a less negative bias in comparison to the bias of FIG. 11. This produces a different electric field, as shown by electric field lines 100, which also correspondingly results in different optics (e.g., focus, beam spot size and/or location, shape, and so forth) for the electron beam 48.

Figure 13:
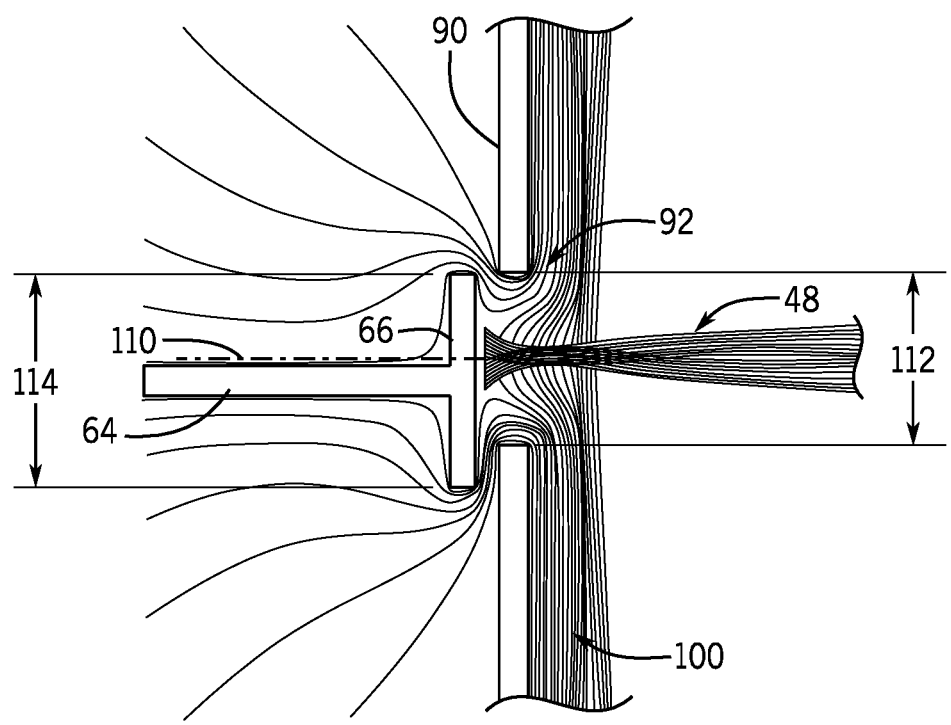
FIG. 13 is an electrical field simulation diagram illustrating the stability of the electron beam even despite movement by the electron emitter, in accordance with an embodiment.

In addition, as shown in FIG. 13, the aperture assembly 90 may improve the stability of the electron beam 48 even despite movement of movement by the electron emitter 66 that might occur in a harsh downhole environment. In particular, the aperture assembly 90 may be rigidly mounted inside the acceleration chamber housing 40. Thus, since the aperture 92 defines the electron beam 48 optics, rather than the emitter 66, even when the emitter 66 moves, the electron beam 48 may remain in place. This may occur in part because the aperture 92 may at least partly cover the exposed thermionic emission material 72 of the emitter 66. In some examples, a diameter of the exposed surface of the thermionic emission material 72 on the emitter 66 may be greater than a diameter of the aperture 92. As seen in FIG. 13, the electron beam 48 is emitted along an axis 110 defined by the center of the aperture 92, which may have a diameter 112. The emitter 66, which may have a larger diameter 114, may allow the emitter 66 to continue to emit electrons that form the electron beam 48 in the aperture 92 even when the emitter 66 moves (e.g., shakes or vibrates) in a harsh downhole environment.

The systems and methods of this disclosure may used with other suitable charged-particle-beam-forming electronic devices, in which beam spot stability is of concern (e.g., in a high-vibration or high-shock environment). A stable electron or ion beam as taught by this disclosure may be used for any suitable ion accelerators, such as neutron tubes, as well as accelerators for ionizers and other electron beam devices.

The specific embodiments described above have been shown by way of example, and these embodiments may be susceptible to various modifications and alternative forms. It should be further understood that the claims are not intended to be limited to the forms disclosed, but rather to cover suitable modifications, equivalents, and alternatives.

The invention claimed is:

1. A downhole tool comprising:
an electronic radiation generator configured to generate radiation to be output from the downhole tool, wherein the electronic radiation generator comprises:
a cathode emitter configured to emit electrons, wherein the cathode emitter comprises:
a substrate;
a thermionic emission material disposed over at least part of the substrate, wherein the thermionic emission material is configured to emit electrons when heated to a thermal emission temperature; and
a protective layer partially disposed around an edge of a top surface of the thermionic emission material to reduce electron emission from the edge, wherein at least part of the thermionic emission material is exposed, wherein the protective layer extends beyond the exposed part of the thermionic emission material in a direction of the target, wherein the protective layer comprises a material having a work function higher than that of the thermionic emission material;
an acceleration chamber through which the electrons are accelerated; and
a target configured to generate the radiation when struck by the accelerated electrons; and
a radiation detector configured to detect a portion of the radiation that returns to the downhole tool.

2. The downhole tool of claim 1, wherein the thermionic emission material comprises yttrium oxide.

3. The downhole tool of claim 1, wherein the thermionic emission material comprises lanthanum hexaboride.

4. The downhole tool of claim 1, wherein the top surface of the thermionic emission material that is exposed through the protective layer comprises a profile that is substantially planar.

5. The downhole tool of claim 1, wherein the top surface of the thermionic emission material that is exposed through the protective layer comprises a profile that has an at-least-partly inversely conical shape into the thermionic emission material.

6. The downhole tool of claim 1, wherein the protective layer comprises a material having a work function higher than 2.6 eV.

7. The downhole tool of claim 1, wherein the protective layer comprises a metal.

8. The downhole tool of claim 1, wherein the protective layer comprises a material having a melting point higher than the thermal emission temperature.

9. The downhole tool of claim 1, wherein the electronic radiation generator comprises an aperture assembly that forms an aperture in front of the cathode emitter in relation to the target, wherein the aperture assembly at least partially blocks the top surface of the thermionic emission material in relation to the target, wherein the aperture shapes the electron beam, and wherein the aperture causes the electron beam to remain substantially constant despite movement by the cathode emitter.

10. The downhole tool of claim 1, wherein the top surface comprises a first portion of the thermionic emission material that is closest to the target.

11. An electronic radiation generator comprising:
   a target material configured to emit radiation in response to being struck by an accelerated electron beam;
   an accelerator chamber configured to accelerate the electron beam toward the target;
   a cathode emitter configured to emit electrons, wherein the electrons are emitted by an exposed portion of a top surface of a thermionic emission material of the cathode emitter, wherein a non-exposed portion of the top surface of the thermionic emission material of the cathode emitter is covered around an edge of the top surface by a protective layer to reduce electron emission on the edge of the top surface, the protective layer comprising a material having a work function higher than that of the thermionic emission material; and
   an aperture assembly that forms an aperture in front of the cathode emitter in relation to the target, wherein the aperture assembly at least partially blocks the exposed portion of the top surface of the thermionic emission material in relation to the target, wherein the aperture assembly is configured to focus the electron beam, and wherein the aperture assembly is negatively biased.

12. The electronic radiation generator of claim 11, wherein the aperture assembly is fixedly coupled to the accelerator chamber and configured to maintain the aperture in the same location in relation to the accelerator chamber despite movement of the electronic radiation generator that shakes the cathode emitter.

13. The electronic radiation generator of claim 11, wherein the aperture assembly is electrostatically biased in relation to the cathode emitter and the target.

14. The electronic radiation generator of claim 11, wherein the exposed portion of the top surface of the thermionic emission material of the cathode emitter has a diameter that is greater than a diameter of the aperture.

15. The electronic radiation generator of claim 14, wherein the aperture is configured to block an outer portion of an entire diameter of the exposed portion of the top surface of the thermionic emission material of the cathode emitter when the electronic radiation generator is not moving.

16. The electronic radiation generator of claim 11, wherein the cathode emitter comprises:
   a substrate;
   the thermionic emission material disposed over at least part of the substrate, wherein the thermionic emission material is configured to emit electrons when heated to a thermal emission temperature; and
   the protective layer partially disposed over the thermionic emission material, wherein at least part of the thermionic emission material is exposed.

17. A method for manufacturing a focused emitter for a radiation generator, the method comprising:
   depositing a thermionic emission material on a substrate;
   depositing a protective layer on top of the thermionic emission material,
   wherein the protective layer comprises a material having a work function
   higher than that of the thermionic emission material; and
   removing a portion of the protective layer to partially expose a top surface of the thermionic emission material such that the protective layer is disposed around an edge of the top surface to reduce electron emission from the edge of the top surface, and wherein the top surface comprises a profile that has an at-least-partly inversely conical shape into the thermionic emission material.

18. The method of claim 17, wherein removing the portion of the protective layer comprises ion milling.

19. The method of claim 17, wherein removing the portion of the protective layer comprises etching.

20. The method of claim 17, comprising removing a portion of the thermionic emission material during or after removing the portion of the protective layer.

* * * * *